US011051232B2

(12) United States Patent
Skarp (10) Patent No.: US 11,051,232 B2
(45) Date of Patent: *Jun. 29, 2021

(54) MANAGING WIRELESS TRANSMISSION CAPACITY

(71) Applicant: NOKIA TECHNOLOGIES OY, Espoo (FI)

(72) Inventor: Mika Skarp, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,843

(22) Filed: Apr. 26, 2019

(65) Prior Publication Data
US 2019/0253954 A1    Aug. 15, 2019

Related U.S. Application Data

(63) Continuation of application No. 15/211,573, filed on Jul. 15, 2016, now Pat. No. 10,321,383, which is a (Continued)

(30) Foreign Application Priority Data

May 10, 2013    (FI) ...................................... 20135486

(51) Int. Cl.
*H04W 48/06*    (2009.01)
*H04L 29/08*    (2006.01)
(Continued)

(52) U.S. Cl.
CPC .......... *H04W 48/06* (2013.01); *H04L 67/306* (2013.01); *H04W 4/90* (2018.02); *H04W 48/12* (2013.01); *H04W 4/02* (2013.01)

(58) Field of Classification Search
CPC ......... H04W 48/12; H04W 4/90; H04W 4/02; H04W 48/06; H04L 67/306
See application file for complete search history.

(56) References Cited

U.S. PATENT DOCUMENTS 7,043,225 B1    5/2006  Patel et al.
8,296,810 B1    10/2012 Everson et al.
(Continued)

FOREIGN PATENT DOCUMENTS

EP    1 672 952 A1    6/2006
GB    2 423 216 A     8/2006
(Continued)

OTHER PUBLICATIONS

Jan. 10, 2019 Office Action issued in U.S. Appl. No. 14/890,203. Copy submitted in parent U.S. Appl. No. 15/211,573.
(Continued)

*Primary Examiner* — Brian D Nguyen
(74) *Attorney, Agent, or Firm* — Squire Patton Boggs (US) LLP (57) ABSTRACT

An apparatus and method for modifying a priority of a public safety user in a wireless network is provided. The wireless network comprises a database for storing the priority related to users. The method may include receiving a message from a customer, at a broker server, where the message informs the broker server about priority requirements of the public safety user. The method may then include sending, by the broker server, a request to the wireless network to modify the priority of the public safety user in a database in the wireless network.

15 Claims, 10 Drawing Sheets

Related U.S. Application Data continuation-in-part of application No. 14/890,206, filed as application No. PCT/FI2014/050343 on May 9, 2014, now Pat. No. 9,894,562.

(51) Int. Cl.
*H04W 4/90* (2018.01)
*H04W 48/12* (2009.01)
*H04W 4/02* (2018.01)

(56) References Cited

U.S. PATENT DOCUMENTS

| | | | |
|---|---|---|---|
| 8,359,622 B1 | 1/2013 | Everson et al. | |
| 9,432,451 B2 | 8/2016 | Pascual Avila | |
| 9,571,546 B2 | 2/2017 | Nyberg | |
| 9,894,562 B2 | 2/2018 | Skarp | |
| 2002/0093948 A1 | 7/2002 | Dertz et al. | |
| 2002/0199012 A1 | 12/2002 | Cable et al. | |
| 2003/0110283 A1 | 6/2003 | Lee | |
| 2004/0019539 A1* | 1/2004 | Raman | G06Q 20/28 705/29 |
| 2004/0106403 A1 | 6/2004 | Mori et al. | |
| 2004/0128386 A1 | 7/2004 | Oomoto et al. | |
| 2006/0241982 A1* | 10/2006 | Seifert | G06Q 30/02 705/4 |
| 2007/0293268 A1 | 12/2007 | Isobe et al. | |
| 2008/0028044 A1* | 1/2008 | Powers | G06Q 10/107 709/219 |
| 2010/0161800 A1 | 6/2010 | Moon | |
| 2011/0154420 A1 | 6/2011 | Korte et al. | |
| 2011/0158095 A1 | 6/2011 | Alexander | |
| 2011/0162013 A1 | 6/2011 | Bagasra et al. | |
| 2011/0261695 A1 | 10/2011 | Zhao et al. | |
| 2011/0276431 A1 | 11/2011 | Sturm et al. | |
| 2011/0276719 A1 | 11/2011 | Sturm et al. | |
| 2012/0014255 A1 | 1/2012 | Svedberg | |
| 2012/0014332 A1 | 1/2012 | Smith et al. | |
| 2012/0016993 A1 | 1/2012 | Kisel et al. | |
| 2012/0058742 A1 | 3/2012 | Razoumov et al. | |
| 2012/0133731 A1 | 5/2012 | Lin et al. | |
| 2012/0203822 A1* | 8/2012 | Floyd | H04L 47/22 709/203 |
| 2012/0219014 A1 | 8/2012 | Glaeser | |
| 2012/0314127 A1 | 12/2012 | Syed et al. | |
| 2013/0035107 A1 | 2/2013 | Chan et al. | |
| 2013/0042275 A1 | 2/2013 | Payette et al. | |
| 2013/0054298 A1 | 2/2013 | Skarp et al. | |
| 2013/0054833 A1 | 2/2013 | Skarp et al. | |
| 2013/0229918 A1 | 9/2013 | Ludwig | |
| 2013/0343375 A1* | 12/2013 | Song | H04L 12/4633 370/352 |
| 2014/0047114 A1 | 2/2014 | Chokshi | |
| 2014/0067905 A1* | 3/2014 | Jansson | G06F 9/5033 709/202 |
| 2018/0014196 A9* | 1/2018 | Lee | H04W 12/08 |

FOREIGN PATENT DOCUMENTS

| | | |
|---|---|---|
| JP | 2004-179882 A | 6/2004 |
| JP | 2007-336461 A | 12/2007 |
| JP | 2008-236593 A | 10/2008 |
| WO | 2010/110707 A1 | 9/2010 |

OTHER PUBLICATIONS

U.S. Office Action U.S. Appl. No. 14/890,203 dated Sep. 22, 2016. Copy submitted in parent U.S. Appl. No. 15/211,573.
International Search Report and Written Opinion dated Jul. 31, 2014 corresponding to related International Patent Application No. PCT/FI2014/050342. Copy submitted in grand parent U.S. Appl. No. 14/890,206. Copy submitted in grand parent U.S. Appl. No. 14/890,206.
International Search Report and Written Opinion dated Aug. 27, 2014 corresponding to International Patent Application No. PCT/FI2014/050343. Copy submitted in grand parent U.S. Appl. No. 14/890,206. Copy submitted in grand parent U.S. Appl. No. 14/890,206.
International Preliminary Report on Patentability dated Aug. 13, 2015 corresponding to related International Patent Application No. PCT/FI2014/050342. Copy submitted in grand parent U.S. Appl. No. 14/890,206.
German Office Action issued in corresponding German Patent Application No. DE 11 2014 002 348.5 dated Jul. 4, 2019.
German Office Action issued in corresponding German Patent Application No. DE 11 2014 002 365.5 dated Jul. 4, 2019.
Japanese Office Action issued in corresponding Japanese Patent Application No. 2016-512401 dated Apr. 9, 2018.
Japanese Office Action issued in corresponding Japanese Patent Application No. 2016-512402 dated Apr. 9, 2018.
Office Action issued in corresponding Japanese Patent Application No. 2019-043531 dated Jun. 2, 2020, with English translation thereof.

* cited by examiner

| | A1 | A2 | A3 | . . . |
|---|---|---|---|---|
| 07:00 - 08:00 | AVAIL.: N/A<br>RESERVED: N/A | AVAIL.: N/A<br>RESERVED: N/A | AVAIL.: N/A<br>RESERVED: N/A | . . . |
| 08:00 - 09:00 | AVAIL.: N/A<br>RESERVED: N/A | AVAIL.: N/A<br>RESERVED: N/A | AVAIL.: N/A<br>RESERVED: N/A | . . . |
| 09:00 - 10:00 | AVAIL.: N/A<br>RESERVED: N/A | AVAIL.: N/A<br>RESERVED: N/A | AVAIL.: N/A<br>RESERVED: N/A | . . . |
| ⋮ | ⋮ | ⋮ | ⋮ | ⋮ |

Fig. 6A

|  | A1 | A2 | A3 | ... |
|---|---|---|---|---|
| 07:00 - 08:00 | AVAIL.: 10<br>RESERVED: N/A | AVAIL.: 10<br>RESERVED: N/A | AVAIL.: 10<br>RESERVED: N/A | ... |
| 08:00 - 09:00 | AVAIL.: 10<br>RESERVED: N/A | AVAIL.: 10<br>RESERVED: N/A | AVAIL.: 10<br>RESERVED: N/A | ... |
| 09:00 - 10:00 | AVAIL.: 10<br>RESERVED: N/A | AVAIL.: 10<br>RESERVED: N/A | AVAIL.: 10<br>RESERVED: N/A | ... |
| ⋮ | ⋮ | ⋮ | ⋮ | ⋮ |

Fig. 6B

|  | A1 | A2 | A3 | ... |
|---|---|---|---|---|
| 07:00 - 08:00 | AVAIL.: 10<br>RES. USER A: 0<br>RES. USER B: 0 | AVAIL.: 10<br>RES. USER A: 0<br>RES. USER B: 0 | AVAIL.: 5<br>RES. USER A: 5<br>RES. USER B: 0 | ... |
| 08:00 - 09:00 | AVAIL.: 8<br>RES. USER A: 0<br>RES. USER B: 2 | AVAIL.: 8<br>RES. USER A: 0<br>RES. USER B: 2 | AVAIL.: 3<br>RES. USER A: 5<br>RES. USER B: 2 | ... |
| 09:00 - 10:00 | AVAIL.: 8<br>RES. USER A: 0<br>RES. USER B: 2 | AVAIL.: 8<br>RES. USER A: 0<br>RES. USER B: 2 | AVAIL.: 8<br>RES. USER A: 0<br>RES. USER B: 2 | ... |
| ⋮ | ⋮ | ⋮ | ⋮ | ⋮ |

Fig. 6C

|  | A1 | A2 | A3 | ... |
|---|---|---|---|---|
| 07:00 - 08:00 | AVAIL.: 10<br>RES. USER A: 0<br>RES. USER B: 0 | AVAIL.: 10<br>RES. USER A: 0<br>RES. USER B: 0 | AVAIL.: 5<br>RES. USER A: 5<br>RES. USER B: 0 | ... |
| 08:00 - 09:00 | AVAIL.: 8<br>RES. USER A: 0<br>RES. USER B: 2 | AVAIL.: 3<br>RES. USER A: 0<br>RES. USER B: 2<br>RES. USER C: 5 | AVAIL.: (-2) ~601<br>RES. USER A: 5<br>RES. USER B: 2<br>RES. USER C: 5 | ... |
| 09:00 - 10:00 | AVAIL.: 8<br>RES. USER A: 0<br>RES. USER B: 2 | AVAIL.: 3<br>RES. USER A: 0<br>RES. USER B: 2<br>RES. USER C: 5 | AVAIL.: 3<br>RES. USER A: 0<br>RES. USER B: 2<br>RES. USER C: 5 | ... |
| ⋮ | ⋮ | ⋮ | ⋮ | ⋮ |

MANAGING WIRELESS TRANSMISSION CAPACITY

CROSS REFERENCE TO RELATED APPLICATIONS

This application is a Continuation of U.S. Non-Provisional patent application Ser. No. 15/211,573, filed on Jul. 15, 2016, which in turn is a Continuation-in-Part of U.S. Non-Provisional patent application Ser. No. 14/890,206, filed on Nov. 10, 2015, now U.S. Pat. No. 9,894,562, which in turn is a 371 application of International Application No. PCT/FI2014/050343, filed on May 9, 2014, which claims priority from Finish Application No. 21035486, filed on May 10, 2013. The entire contents of these earlier filed applications are hereby incorporated by reference in their entirety.

FIELD OF THE INVENTION

The present invention generally relates to broadcasting content using wireless transmission capacity.

BACKGROUND OF THE INVENTION

Figure 1:
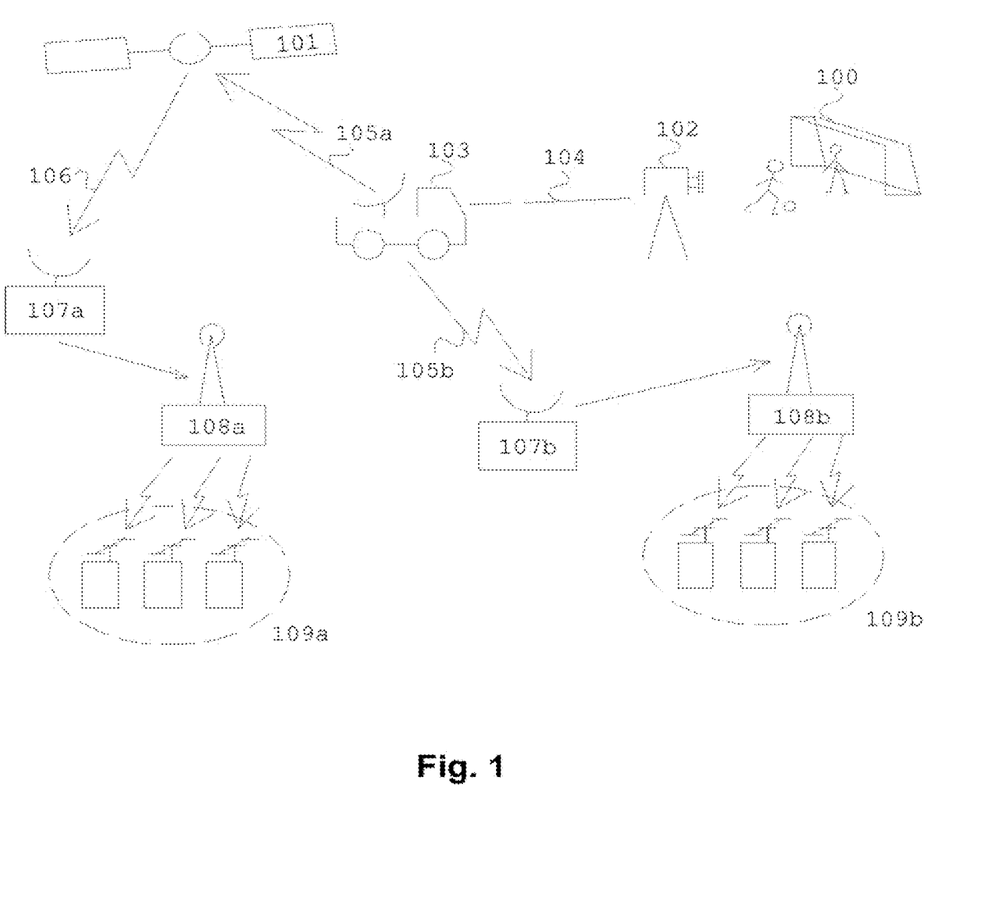
FIG. 1 shows a conventional architecture for implementing a live transmission of an event.

A conventional architecture to broadcast an event in real time or near real time (live) on television or rich media devices is shown in FIG. 1. This architecture has some fundamental inconveniences for TV production companies, mobile TV, IPTV (Internet Protocol television) & internet TV providers like huge logistic cost and reduced flexibility.

In the architecture shown in FIG. 1, the broadcasting (such as, TV broadcasting) of an event 100 of local or regional (e.g. country wide) importance requires the deployment of a mobile control unit 103, commonly known as a satellite truck, to the event location. The mobile control unit 103 processes and transmits images taken by the cameras 102 (and transmitted to the mobile control unit 103 via a cable connection 104) to a TV station that hosts a Master Control Room (MCR) 107a, 107b.

Small to medium media production companies, IPTV, Internet TV and mobile TV providers who usually do not have the financial strength to invest in their own broadcasting equipment will have to rent the required resources from established major TV broadcasting companies. The costs related to the rent, deployment and maintenance of such equipment weigh on the profitability and make it difficult to a certain category of media production companies to enter or establish themselves into the live event broadcasting market.

One the biggest cost factor, besides the required equipment, when broadcasting an event in real time is generated by the transmission of the video signal:

Using microwaves (digital/analog terrestrial) (as depicted by arrow 105b) between the mobile control unit 103 and the local/regional TV station MCR 107b which dispatches the encoded TV/video signal via a TV-broadcasting tower 108b to the respective destination networks 109b; and/or Using (as depicted by arrows 105a and 106) a telecommunication satellite 101 between the mobile control unit 103 and the remote TV station MCR 107a that dispatches the encoded TV/video signal via TV-broadcasting tower 108a to respective destination networks 109a.

One potential way where the lack of flexibility has a negative effect is that usually there are several secondary events happening beside the main event: Interviews in the locker room before or after a game or live reports around the main event location. Those secondary events may have almost the same importance to the end consumer as the main event. Due to the size of the equipment and the required proximity between the cameras and the mobile control unit (for a live retransmission), it is not always possible to provide this information in real time to the end consumer.

SUMMARY

In the context of this application the term event is to be interpreted broadly. The term event should not be limited to cover only short term one-off type events like football games, but an event should be understood as anything that can be covered by a contract defining geographical coverage and duration.

Figure 2:
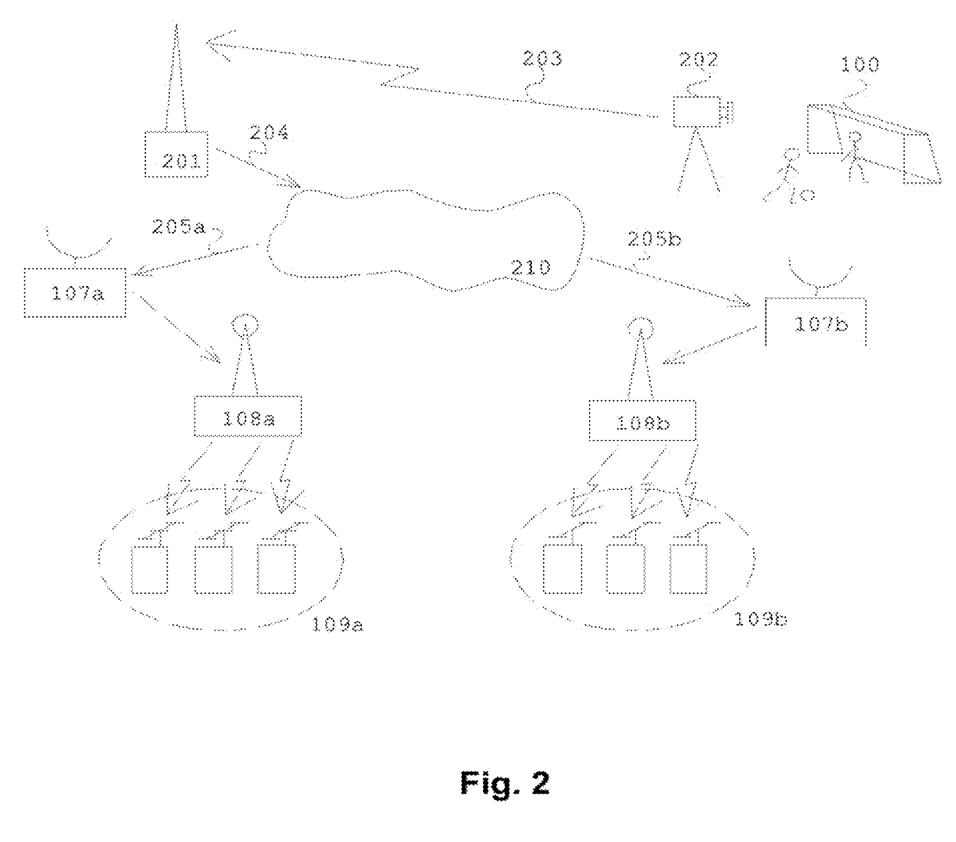
FIG. 2 shows an architecture for implementing a live transmission of an event in accordance with an example embodiment.

In the architecture shown in FIG. 2, broadcasting of an event 100 in real time is arranged so that wireless enabled TV cameras 202 transmit a wireless signal 203 to a base station 201 of a wireless network, which can be, e.g., a cellular network. The base station 201 sends 204 the data via a communication network 210, using methods known as such, to TV-stations 107a, 107b via connections 205a, 205b. The TV-stations 107a, 107b take care of dispatching the encoded TV/video signal via TV-broadcasting towers 108a, 108b to the respective destination networks 109a, 109b.

This architecture is facilitated by the following technological factors:

The deployment of wireless networks, like LTE, across the globe, providing the required quality of service when transmitting a live TV stream over the air.

The availability of new TV-camera models, each with an incorporated wireless feature, such as a cellular modem. Those cameras can transmit captured images directly towards the wireless network to a destination platform.

The usage of the conventional satellite or microwave electronic newsgathering truck (reference 103 in FIG. 1) is not required. The related costs and effort can be reduced: less investment cost due to cheaper equipment and less operative cost due to the simplicity of the new mobile camera set.

The combination of those two factors provides a wide range of benefits, including reduced logistic efforts and lower transmission cost. The costs related to the transmission of content via satellite can get very high compared to the price for a similar bandwidth bundled LTE uplink connection using several SIM cards in the camera's embedded modem.

According to a first example aspect of the invention there is provided a method for managing wireless transmission capacity, comprising:

storing, at a server, available wireless transmission capacity obtained from a wireless transmission capacity provider;

reserving by the server at least part of said available wireless transmission capacity for a first user;

updating said stored information based on said reserved wireless transmission capacity;

receiving by the server an indication about wireless transmission capacity need concerning another user;

detecting that said wireless transmission capacity need cannot be met; and taking action by the server to increase wireless transmission capacity available for allocation for said another user.

The server may be a web server. It may be a broker server providing a brokering service between the wireless transmission capacity provider and the client. The server may reside in an IP network. The wireless transmission capacity provider may be a cellular network operator, a telecom operator. The server may be external to the cellular operator's network. The reserving at least part of said available wireless transmission capacity for a first user may be in response to a request or indication received from the first user or from a client administering the first user. The client (or customer) may be an event promoter, an event organizer, or a media company. The user is typically related to the client. The user may be an actual user (or subscriber) of the wireless transmission system, such as the cellular network. The cellular network may be an LTE network. The user may be identified by a user identity. Accordingly, the reserving the capacity for the first user in certain example embodiments means reserving for a first user identity (similarly reserving for another user in certain example embodiments means reserving for another user identity). The user may be a cellular modem camera containing a user identification module for user identification. Such a cellular modem camera may be used to capture an event and to transmit video/TV signals by the allocated capacity to the wireless transmission capacity provider's network to be further broadcasted or live streamed to consumer devices. A bundled LTE uplink connection may be used between cellular modem camera(s) and cellular network.

In certain example embodiments, the server requests the wireless transmission capacity provider to allocate the reserved wireless transmission capacity for the first user. The reserving and subsequent allocating may be performed for broadcasting content. The reserving and allocating may be performed for live broadcasting or live streaming a certain event, a media event. Similarly, in certain example embodiments, the server requests the wireless transmission capacity provider to allocate the needed wireless transmission capacity for said another user. Said another user may be a high priority user, such as an authority or a user representing an authority, such as a fire truck. However, said another user is not limited to "authority users".

In certain example embodiments, the stored available wireless transmission capacity and the wireless transmission capacity need are time-dependent. The reserving and allocating may be performed time-dependently. The allocating may be done for the reserved time period (duration of the reservation).

In certain example embodiments, the stored available wireless transmission capacity and the wireless transmission capacity need are location-dependent. The reserving and allocating may be performed time-dependently. The allocating may be done for the reserved geographical location.

In certain example embodiments, the method comprises maintaining a capacity area grid comprising time- and location-dependent information about available and reserved wireless transmission capacity.

In certain example embodiments, said requesting to allocate comprises sending an indication to modify service priority concerning the user concerned. In certain example embodiments, the service priority is quality of service QoS priority.

In certain example embodiments, said wireless transmission capacity provider operates a cellular network and said server operates from the outside of the cellular network.

In certain example embodiments, said requesting to allocate comprises indicating to modify priority of a user identity in a database, such as a Policy and Charging Rules Function (PCRF) database, a Home Subscriber Server (HSS) or Packet Data Network Gateway (PGW) of an LTE telecommunication network. Said database may be a network operator's database. Accordingly, said database may be a subscriber priority information database, the term comprising also network elements in which subscriber priority related information can be stored.

In certain example embodiments, said indicating to modify indicates to turn on the priority "Conversational video" for said user identity for the duration of the time reserved.

Depending on the implementation, the indication about wireless transmission capacity need concerning said another user is received from said another user or from a client (e.g., an authority) administering said user.

In certain example embodiments, the method comprises: requesting the wireless transmission capacity provider to provide more wireless transmission capacity for the use of the server. The request can comprise time, location and bandwidth requirements.

In certain example embodiments, the method comprises: requesting another wireless transmission capacity provider to provide wireless transmission capacity for the use of the server. Again, the request can comprise time, location and bandwidth requirements.

In certain example embodiments, the method comprises: upon obtaining additional wireless transmission capacity (to be allocated), updating said stored information about available wireless transmission capacity;
reserving at least part of said additional wireless transmission capacity for said another user; and, in certain example embodiments,
requesting the wireless transmission capacity provider concerned to allocate said wireless transmission capacity, reserved for said another user, to said another user.

In certain example embodiments, the method comprises: indicating to at least one user to reduce its bandwidth usage.

In certain example embodiments, the method comprises: indicating to at least one user to start storing locally the data to be transmitted until sufficient capacity is again available.

In certain example embodiments, the method comprises informing at least one user about lack of wireless transmission capacity; and
informing the at least one user again when the lack of wireless transmission capacity has been cleared.

Herein the term at least one user comprises said first user and said another user as well as other possible users that there might be. Accordingly, said indicating and/or informing to said at least one user comprises indicating and/or informing to said first user and/or said another user. Said indicating and/or informing to said at least one user also comprises embodiments of indicating and/or informing to said first user without indicating and/or informing to said another user, and vice versa. If there are other users, the indicating and/or informing may be done to them also depending on the embodiment.

In certain example embodiments, the method comprises: prioritizing said first user and said another user based on the prioritization level of applications they are running.

In certain example embodiments, the method comprises: prioritizing said first user and said another user based on their bandwidth usage and the prioritization level of applications they are running.

In certain example embodiments, said another user is a public safety official.

According to a second example aspect of the invention there is provided an apparatus for managing wireless transmission capacity, comprising:
storing means arranged to store available wireless transmission capacity obtained from a wireless transmission capacity provider;
reserving means arranged to reserve at least part of said available wireless transmission capacity for a first user;

updating means arranged to update said stored information based on said reserved wireless transmission capacity;
receiving means arranged to receive an indication about wireless transmission capacity need concerning another user;
detecting means arranged to detect that said wireless transmission capacity need cannot be met; and
means arranged to take action to increase wireless transmission capacity available for allocation for said another user.

The apparatus may be a server. It may be a broker server providing a brokering service between the wireless transmission capacity provider and clients. The server may be a server configured to operate in an IP network. In certain example embodiments, the storing means comprises a memory element, such as a database. In certain example embodiments, the reserving means, the updating means and the detecting means comprise a processor (or processing unit) and said memory element. In certain example embodiments, the receiving means comprises a communication module and said processor. In certain example embodiments, the means arranged to take action comprises said processor. The processor may be controlled by computer program code stored in a memory.

In certain example embodiments, the apparatus is configured to maintain in the database a capacity area grid comprising time- and location-dependent information about available and reserved wireless transmission capacity.

In certain example embodiments, the indication about wireless transmission capacity need concerning another user comprises time- and location-dependent information. Accordingly, the means configured to receive in certain example embodiments are configured to receive time- and location-dependent information.

In certain example embodiments, said means arranged to take action are arranged to perform at least one of the following actions:
requesting the wireless transmission capacity provider to provide more wireless transmission capacity for the use of the apparatus;
requesting another wireless transmission capacity provider to provide wireless transmission capacity for the use of the apparatus;
indicating to at least one user to reduce its bandwidth usage; and
indicating to at least one user to start storing locally the data to be transmitted until sufficient capacity is again available.

Said requesting and indicating can be performed for example, by transmitting a suitable request or message via a transmitting means (e.g., the communication module).

In certain example embodiments, the apparatus is configured to prioritize said first user and said another user based on the prioritization level of applications they are running.

In certain example embodiments, the apparatus comprises transmitting means arranged to transmit a request to a wireless transmission capacity provider to allocate wireless transmission capacity, reserved for said another user, to said another user.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well. Any appropriate combinations of the embodiments may be formed.

According to another embodiment of the invention, a method is provided for modifying a priority of a public safety user in a wireless network. The method may include receiving a message from a customer, at a broker server, wherein the message informs the broker server about priority requirements of the public safety user. The method may then include sending, by the broker server, a request to the wireless network to modify the priority of the public safety user in a database in the wireless network. In some embodiment of invention the brokering server can be a Dynamic Profile Controller entity.

According to yet another embodiment of the invention, an apparatus is provided for modifying a priority of a public safety user in a wireless network. The wireless network may include a database for storing the priority related to users. The apparatus includes a brokering system comprising a first interface to said wireless network to modify a user profile of a public safety user in said database in said wireless network. The brokering system includes a second interface to a customer, and the brokering system is configured to receive, via the second interface, a message informing the brokering service about priority requirements of the public safety user. Based on the message received over the second interface, the brokering system is configured to send a request over the first interface to modify the priority of the public safety user in the database in the wireless network.

BRIEF DESCRIPTION OF THE DRAWINGS

The invention will now be described, by way of example only, with reference to the accompanying drawings, in which.

DETAILED DESCRIPTION

Figure 3:
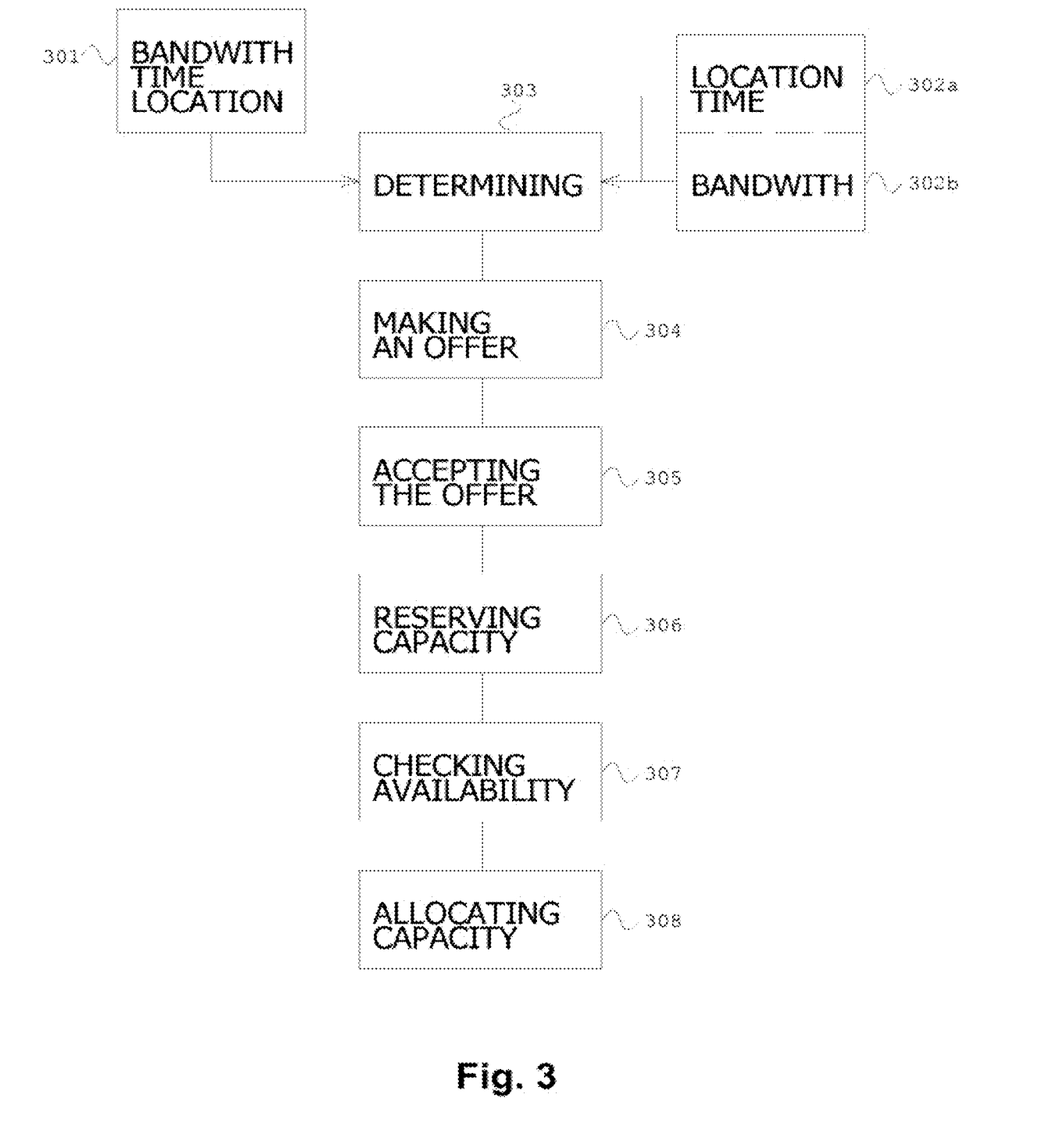
FIG. 3 shows a method for managing wireless transmission capacity in accordance with an example embodiment.

A method to manage wireless transmission capacity in accordance with an example embodiment is explained by referring to FIG. 3. The capacity could be used to provide media coverage for an event via streaming or some other broadcasting method.

In step 301, a mobile network operator or whoever has power to allocate wireless transmission resources (e.g., a Mobile Virtual Network Operator, MVNO) agrees with a broker service provider, represented by a server (more closely described in connection with FIG. 4), about the amount of wireless transmission capacity available for the broker service provider. As an example, the operator provides the broker service provider with information on bandwidth, time and location, i.e., where and when and how much bandwidth the broker service provider has in its disposal. In the simplest form the operator agrees to give a certain bandwidth at the whole area of its network 24/7. Alternatively, the operator provides for the broker service provider only the capacity it sees unlikely to sell itself. For example, the operator might keep the total capacity or a part of it during the peak hours, and only provide the remaining capacity for the broker service provider, and/or the operator might refrain from providing the broker service provider with at least a part of the capacity at predefined locations.

In steps 302a and 302b, the broker service provider is informed about the time and location of an event needing wireless transmission capacity, as well as the required bandwidth. An event organizer may inform (302a) the broker service provider about the time and location, e.g., a football game held in a certain stadium at a certain date and time. If the event organizer is also responsible for the live broadcast of the event, or if it knows the bandwidth requirements, it can also identify the bandwidth requirements needed (302b). However, it is alternatively possible that the bandwidth requirements are informed by a media company (or provider) responsible for covering the event. It is even possible that the media company has found the need for covering such an event from said broker service provider and offered their service to the event organizer, or the broker service provider may suggest a bandwidth and the event organizer or media company, as the role of a customer, may respond with the bandwidth requirement.

In an example embodiment, the information provided in steps 302a and 302b could, for example, comprise information like:

Name of the event promoted (E.g. London Olympic games, soccer)
  Description of the event (Further information)
  Category (The category to which the event belongs to: sport, music, politics, etc.)
  Start: Start date and time of the event
  End: End date and time of the event
  Address: Main address where the event will take place
  Coordinates: GPS-coordinates to identify the geographical location where the event will take place
  Radius: Radius outgoing from the main address and defining the geographical area covered by the event
  Bandwidth: Bandwidth requirement.

Based on the information it received in step 301, the broker service provider knows the available wireless transmission capacity. It may, for example, use a capacity area grid, explained later in the description. In step 303, the broker service provider determines if there is capacity to fulfil the bandwidth requirement of the event in the location and times indicated.

If the available wireless capacity is found the broker service provider makes an offer in step 304 to the event organizer, or to the media company. Depending on how the broker service, provided by the broker service provider, has been build the offer can take different forms. If the broker service has a web-based interface for the customer to input their need, the offer may simply be a new pop-up window detailing the offer and asking the customer to accept of decline the offer. On the other hand, the broker service may be fully automatized; then the offer may be made between two pieces of software; one running in the broker server and the other running in a customer device (the customer in this embodiment meaning the event organizer and/or the media company). The communication between the operator and the broker service provider can be implemented in a similar way.

In step 305, the customer accepts the offer (or part of it). If the broker service provider suggests a bandwidth in the offer, the customer may, for example, accept the total bandwidth offered or only a part of it (if this already meets the bandwidth requirement the customer has).

In step 306, the broker service provider reserves the capacity accepted in step 305. This can be, for example, by updating the capacity area grid, as explained later in the description.

The time between the reservation, the actual event and the allocation of the capacity can vary a lot. Depending on the implementation, the allocation can be performed immediately after the reservation, or it can be performed months after the reservation. For this reason, the broker service provider can make a final check about the available resources at some time before the capacity is allocated, just to make sure that the resources are really available (step 307). This check can be performed by utilizing the capacity area grid, mentioned in the foregoing, and explained later in the description.

In step 308, the broker service provider sends a request to the operator to allocate the reserved capacity. The reserved capacity is allocated to be used to cover the reservation. The allocation is done, in certain example embodiments, by modifying the priority of at least one user identity in a database. The database can be a subscriber policy database or some other network element capable of storing subscriber priority related information. In the event of an LTE network, the function maintaining the database can be, e.g., a Policy and Charging Rule Function (PCRF), a Home Subscriber Server (HSS) or Packet Data Network Gateway (PGW). In certain example embodiments, the priority is modified by setting the service type attached to said at least one user identity to "Conversational video" in the Police and Charging Rule Function for the duration of the reservation (so that the priority related to that service type becomes also selected). A guaranteed bit rate radio resource type can be used. Said at least one user identity herein refers to the user identity in a user identification module of a cellular modem camera used to capture the event.

Figure 4:
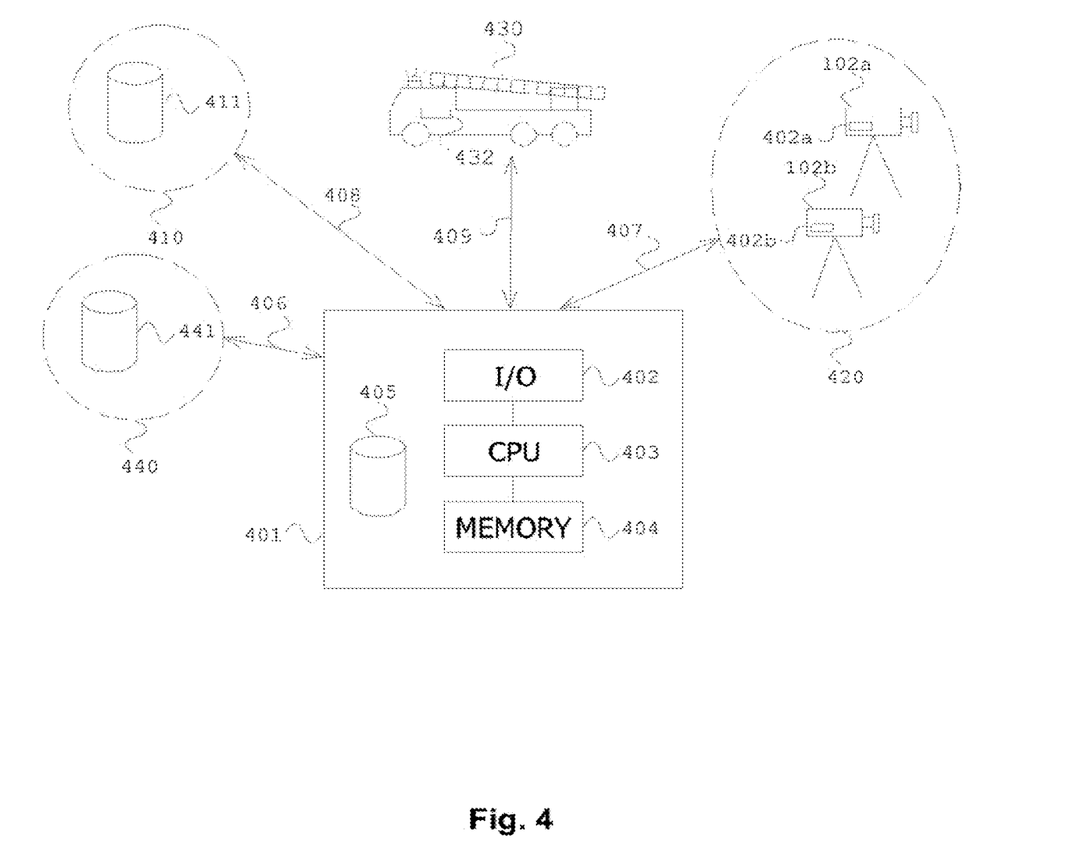
FIG. 4 shows an apparatus for managing wireless transmission capacity in accordance with an example embodiment.

FIG. 4. shows an apparatus for managing wireless transmission capacity in accordance with an example embodiment. The apparatus comprises a broker server 401. The broker server 401 comprises a processor (CPU or similar) 403. The broker server 401 further comprises a memory 404 connected to the processor 403. The processor 403 is configured to run broker server software stored in the memory 404 to control the operations of the broker server 401. The brokering server can be, for example, a Dynamic Profile Controller entity.

The broker server 401 further comprises an input/output system 402 (or a communication module) for communicating with network of the event organizer or the media company 420 via a connection 407 and communicating via a connection 408 with the network (operator network) 410 providing wireless transmission capacity, such as the LTE network.

The broker server 401 further comprises a database 405 for storing a capacity area grid, or similar, with the aid of which the broker server 401 maintains the available wireless transmission capacity and its reservation.

The operator network (cellular network) 410 comprises a database 411, such as PCRF database for LTE network. As mentioned, the database can be a subscriber policy database or some other network element (such as the HSS or PGW) capable of storing subscriber priority related information. When the broker server 401, which may be a server external to the operator network 410, requests the operator network to allocate wireless transmission capacity in certain example embodiments, the PCRF database, HSS or PGW, depending on the implementation, is used as described in the foregoing.

In one embodiment, for example, the broker server 401 may request the operator network to modify a user profile of authority 430 (i.e., a public safety user) in the database 411. For instance, the request to modify the user profile may include a request to modify the priority of authority 430 in the database 411, which stores the subscriber priority related information. According to some embodiments, the request to modify the user profile may be sent in response to receiving a message from a customer informing the broker server 401 of an update in the priority requirements of the authority 430.

FIG. 4 further shows two wireless capable cameras, that is, cellular modem cameras 102a, 102b equipped with user identities in user identification modules 402a, 402b, like SIM cards. The user identities in the user identification modules represent users of the wireless transmission system, that is, users that need wireless transmission capacity (or radio resources) for communication of data, such as video/TV signals. An authority 430, represented by a fire truck in FIG. 4, also comprises a wireless transmission feature, such as a cellular modem with a user identity 432. The authority 430 may be a high priority customer (or user). Accordingly, if the authority needs wireless transmission capacity, this need can override the wireless transmission capacity needs of other users. Instead or as well there may be other high priority customers. In certain example embodiments, if wireless transmission capacity is needed for the high priority customer, the required capacity is obtained for the high priority customer, as described in more detail later in the description.

FIG. 4 further shows a second operator network 440, such as another cellular network. The second operator network may be operated by the operator operating the network 410, or by a different operator. It may be an LTE network. In certain example embodiments, the second operator network 440 is used to provide further wireless transmission capacity for users, if the wireless transmission capacity provided by the (first) network 410 runs out. The second operator network 440 comprises a database 441, such as PCRF, HSS or PGW for LTE network. The database can be a subscriber policy database or some other network element capable of storing subscriber priority related information. The broker server 401 communicates with the second operator network via a connection 406.

Figure 5:
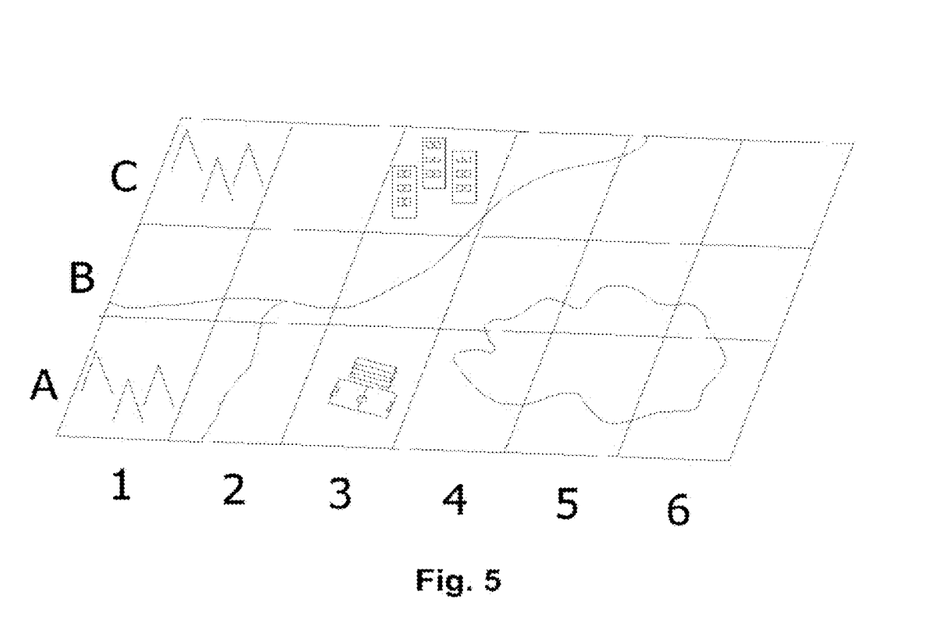
FIG. 5 shows a visualization of a capacity area grid in accordance with an example embodiment.

FIG. 5 shows the formation of a capacity area grid in accordance with an example embodiment. The cells of a capacity area grid herein are basically cells of a map grid identifying the geographical locations, here locations or cells A1-C6. On each grid cell the broker service provider maintains information on how much capacity it has to available to sell and how much it has already reserved as a function of time. This is illustrated further in the capacity area grid usage scenarios of FIGS. 6A-6D.

Figure 6A:
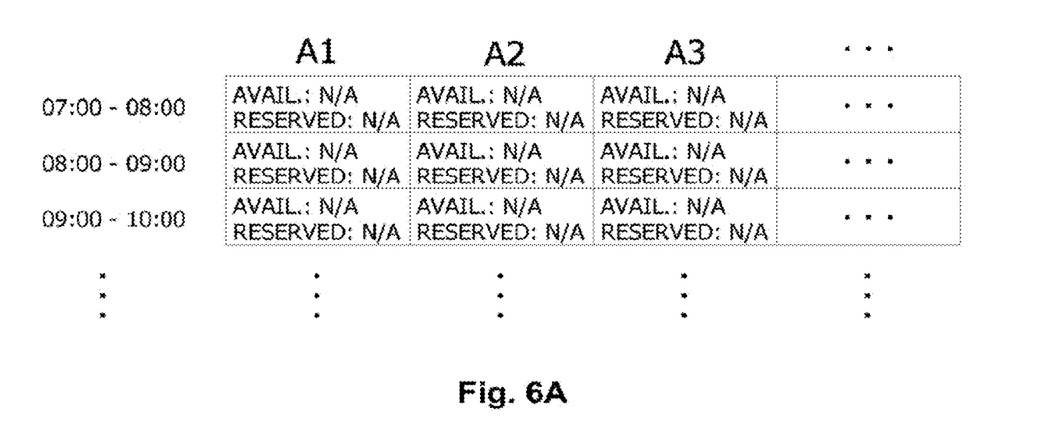
FIGS. 6A-6D show capacity area usage scenarios in accordance with an example embodiment.

FIG. 6A shows an empty grid before available wireless transmission capacity is received from the operator: All cells at all times: Availability=N/A and reservation=N/A.

Figure 6B:
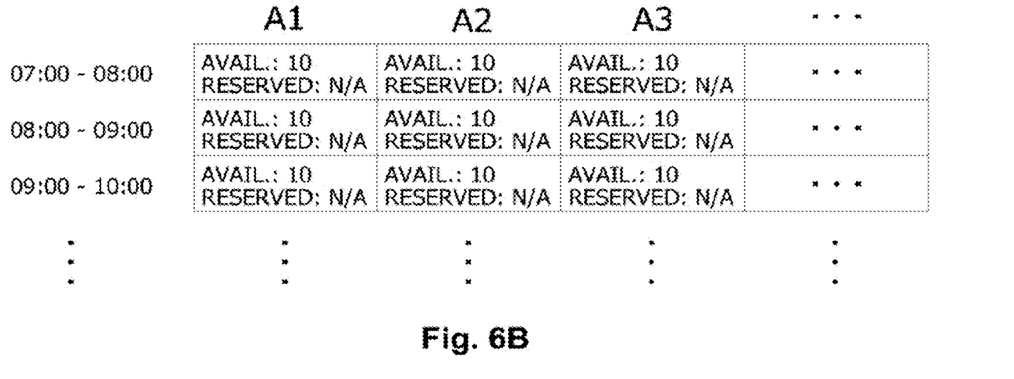

FIG. 6B shows the capacity area grid in a situation in which the broker service provider has received the available wireless transmission capacity from the operator, but the broker service provider has not made any reservations yet: All cells at all times: Availability=10 MB and reservation=N/A. FIG. 6B assumes the simplest case in which the operator has given same resources to the whole network 24/7 (at all times). It should be noted that in practice the operator might want to vary the capacity it gives to the broker service provider based on location and/or time. This is fully supported by the grid, but left out in here to keep the example easier to understand.

Figure 6C:
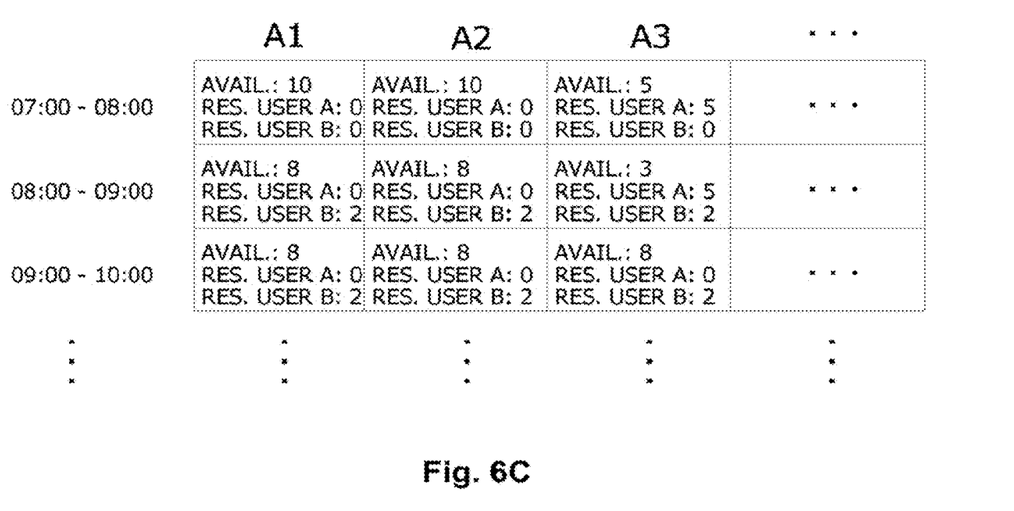

FIG. 6C shows the capacity area grid in a situation in which the broker service provider has received the available wireless transmission capacity from the operator and also has made reservations for the users: The broker has reserved 5 MB capacity for user A in the time period 07:00-09:00 in location A3 and 2 MB capacity for user B for the whole network from the time 08:00 onwards. The capacity area grid shows how much capacity is still left in each of the cells.

In accordance with certain example embodiments, there are provided ways to handle situations where the wireless transmission capacity available for the broker service provider runs out. Determining and handling such situations is now explained referring to FIGS. 6D, 7 and 8.

Figure 6D:
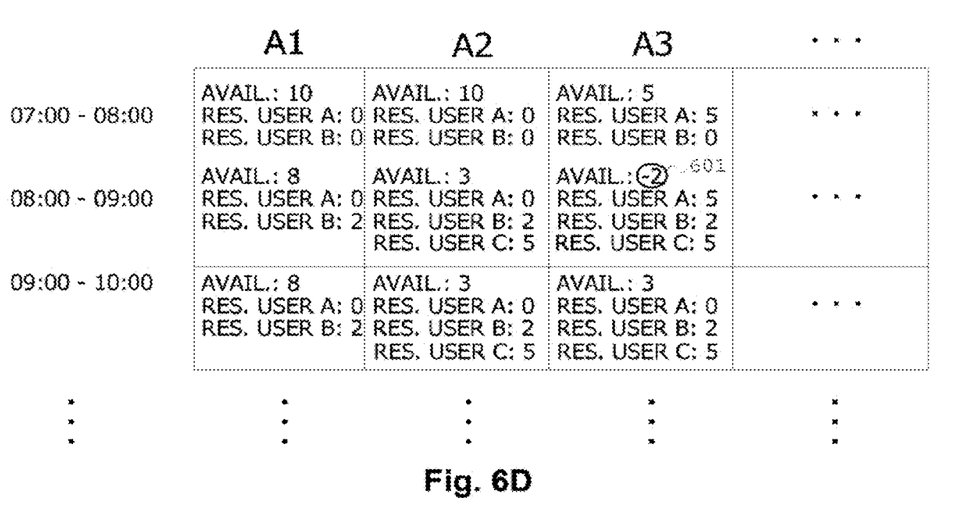

FIG. 6D shows a situation in which a high priority user or application, such as the authority 430 (FIG. 4) informs that they need certain wireless transmission capacity. For example, as illustrated in FIG. 6D, the broker service provider may receive from the high priority user ("User C") an indication of the need of 5 MB bandwidth from 08:00 onwards in cells A2 and A3. In certain embodiments, a customer or authority 430 may send a message to the broker service provider (e.g., broker server 401) that informs the broker service provider about the priority requirements of the authority 430. For example, in an embodiment, the message to the broker service provider (e.g., broker server 401) may inform the broker service provider that the authority 430 should have high priority. Also, in some embodiments, where several public safety users are present, some of the public safety users could be prioritized over other public safety users. For example, the firefighters fighting an actual fire could be given higher priority than the public safety user working on the logistics further away from the actual emergency.

Using the capacity area grid the broker service provider detects 601, typically via an automatized process, that even though in most locations the capacity is available in location A3 from 08:00 to 09:00 there is not sufficient capacity available.

Figure 7:
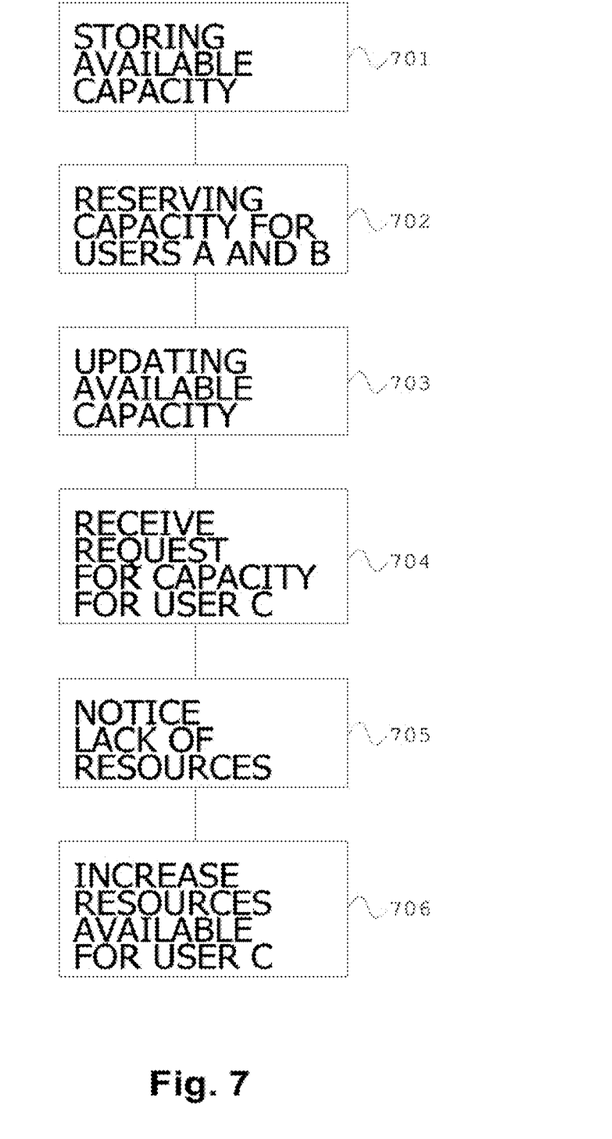
FIG. 7 shows a flow chart showing a method in accordance with an example embodiment.
Figure 8:
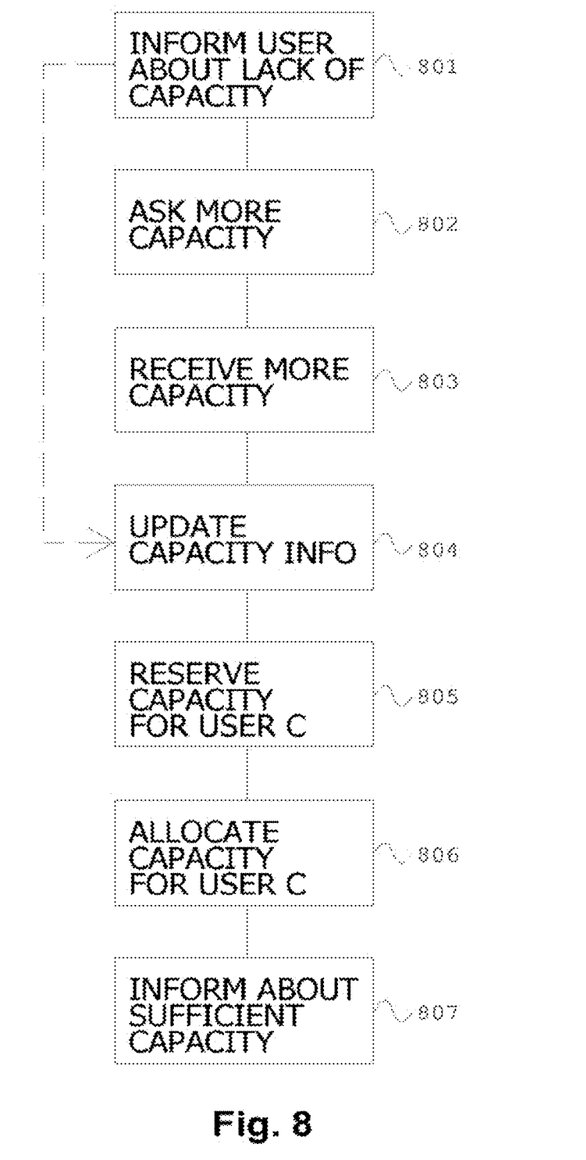
FIG. 8 shows a flow chart showing a method in accordance with another example embodiment.

A method for managing such a situation where it is found that a high priority user has not enough resources is now further explained by referring to the flow charts in FIGS. 7 and 8.

The broker service provider receives available wireless transmission capacity, for example, via the procedure explained in connection with FIG. 3 (step 301), the broker service provider storing it in step 701 into a capacity area grid or similar. The broker service provider reserves capacity in step 702 for the users A and B, for example, by using the procedure described in connection with FIG. 3 (steps 303-306). Further, the broker service provider in step 703 updates the capacity area grid to reflect how much capacity is still available, for example, using the reservation step 306 explained in connection with FIG. 3.

Now, an additional request for wireless transmission capacity comes in (step 704). The broker service provider receives this request from a high priority user (or a higher priority user compared to the present user(s)). For example, the broker service provider may have an agreement with governmental officials/authorities that public safety officials, like police and fire department, must have immediate access to wireless transmission capacity that they need. In an imaginary situation there is a major incident, for example, in the event discussed, at 08:00, and public safety officials (user C, as illustrated in FIG. 6D) request an access to 5 MB capacity in cells A2 and A3 until further notice. This is, for example, to guarantee uninterrupted public safety communication.

In step 705, the broker service provider detects, for example, by using the capacity area grip explained in the preceding in connection with FIG. 6D that there is not enough resources (wireless transmission capacity) to fulfil the request of user C. In step 706, the broker service provider takes action to increase the resources available for user C.

In certain example embodiments, the broker service provider could use more sophisticated algorithms to determine which user to prioritize. These algorithms can include parameters such as how much bandwidth each user is using and/or what level of priority is allocated to the application they are running. For example, an application labelled "Safety official" may be allocated high priority and an application "Media coverage" a lower prioritization.

Some embodiments to increase the wireless transmission capacity for user C are explained with the aid of FIG. 8.

In step 801, the broker service provider notifies the user A or B, or both, that there is lack of available transmission capacity. Also the user C can be informed about the lack of resources in certain example embodiments, since even though there are actions that can be taken to increase the capacity available to user C, these might cause, for example, the connection time to be little longer than if the capacity would have been available right away. As a response to this message the notified users in certain example embodiments either reduce their bandwidth use or start storing the data to be transmitted locally until sufficient capacity is again available. If the message is only sent to user A, this might be all which is needed to get more resources for user C. In such a case the broker service provider may immediately jump to step 804 of updating the capacity area grid.

Alternatively or in addition, the broker service provider in certain example embodiments asks more wireless transmission capacity from the original wireless transmission capacity provider or from some other wireless transmission capacity provider (for example, another operator or another network). This can be implemented by sending a message (or request) to the original wireless capacity provider or to said other wireless capacity provider (or another network) to obtain more resources for the broker service provider to allocate (step 802).

Upon the broker service provider receiving (step 803) more capacity the broker service provider updates (step 804) the capacity information in the capacity area grid, reserves (step 805) wireless transmission capacity for user C. Furthermore, the broker service provider requests the wireless transmission capacity provider to allocate the capacity for user C, similarly as has been described in connection with FIG. 3 (step 308).

In step 807, the broker service provider informs, if needed, the user(s) concerned that the lack of wireless transmission capacity indicated in step (801) has been cleared, and the user(s) can resume normal operation.

Figure 9:
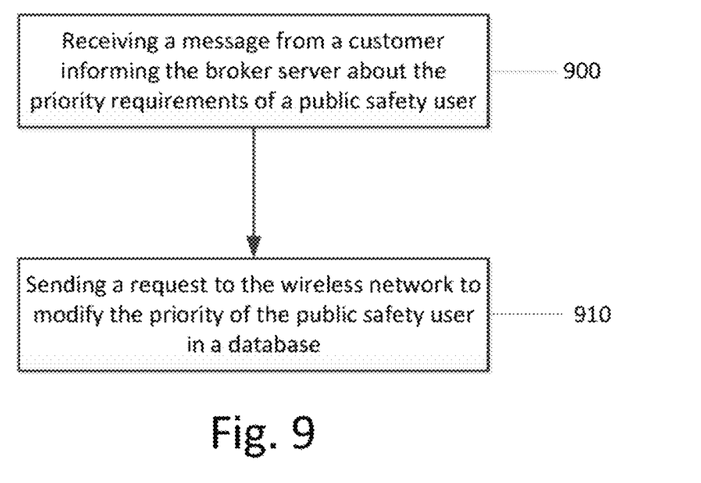
FIG. 9 shows a flow chart showing a method in accordance with another example embodiment.

FIG. 9 illustrates an example flow diagram of a method for modifying a priority of a user, such as a public safety user, in a wireless network, according to one embodiment. In certain embodiments, the method illustrated in FIG. 9 may be performed by the broker server 401, for example.

The method of FIG. 9 may include, at step 900, receiving a message from a customer that informs the broker server 401 about the priority requirements of a public safety user, such as the authority 430. The receiving of the message may also include receiving a message informing the broker server 401 that the public safety user requires a certain wireless transmission capacity. In an embodiment, in response to receiving the message, the method may also include, at step 910, sending a request to the wireless network to modify the priority of the public safety user in a database in the wireless network. The sending of the request may include the sending comprises sending a request to the wireless network to increase the priority of the public safety user in the database. The database may be, for example, a Policy and Charging Rules Function (PCRF) database, a Home Subscriber Server (HSS) or Packet Data Network Gateway (PGW) of an LTE telecommunication network.

In certain embodiments, the method of FIG. 9 may also include detecting that the available wireless transmission capacity is not enough to fulfil the wireless transmission capacity required by the public safety user. In this case, the method may further include taking action by the broker server 401 to increase wireless transmission capacity available for allocation for the public safety user. For example, in one embodiment, the broker server 401 may request a wireless transmission capacity provider to provide more wireless transmission capacity for the public safety user, and/or indicating to at least one other lower priority user to reduce its bandwidth usage.

Without limiting the scope and interpretation of the patent claims, certain technical effects of one or more of the example embodiments disclosed herein are listed in the following: A technical effect is efficient wireless transmission capacity management based on available capacity and transmission capacity need. Another technical effect is providing further wireless transmission capacity for users in the event the wireless transmission capacity initially provided runs out. Another technical effect is providing a method and apparatus for reserving and allocating bandwidth for live broadcast transmission of an event.

It should be noted the some of the functions or method steps discussed in the preceding may be performed in a different order and/or concurrently with each other. Furthermore, one or more of the above-described functions or method steps may be optional or may be combined.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method for modifying a priority of a user in a wireless network, the method comprising:

receiving a message, at a broker server, wherein the message informs the broker server about priority requirements of the user; and sending, by the broker server, a request to the wireless network to modify the priority of the user in the wireless network, wherein the broker server is an entity to which an operator of the wireless network allocates part of the operator's wireless transmission capacity.

2. The method of claim 1, wherein the sending comprises sending a request to the wireless network to increase the priority of the user.

3. The method of claim 1, wherein the broker server is external to the wireless network.

4. The method of claim 1, wherein the receiving further comprises receiving a message informing the broker server that the user requires a certain wireless transmission capacity.

5. The method of claim 4, further comprising:

detecting that an available wireless transmission capacity is not enough to fulfil said certain wireless transmission capacity required by the user.

6. The method of claim 1, further comprising:

taking action by the broker server to increase wireless transmission capacity available for allocation for the user.

7. The method of claim 6, further comprising:

requesting a wireless transmission capacity provider to provide more wireless transmission capacity.

8. The method of claim 6, further comprising:

indicating to at least one other user to reduce its bandwidth usage.

9. An apparatus for modifying a priority of a user in a wireless network, the wireless network comprising a database for storing the priority related to users, the apparatus comprising:

a brokering system configured to send a request to the wireless network to modify a user profile of a user in the database in the wireless network;

the brokering system configured to receive a message informing the brokering system about priority requirements of the user, based on the message received, the brokering system is configured to send the request to the wireless network to modify the priority of the user in the database in the wireless network, wherein the brokering system is an entity to which an operator of the wireless network allocates part of the operator's wireless transmission capacity.

10. The apparatus of claim 9, wherein the request sent to the wireless network comprises a request to increase the priority of the user in the database.

11. The apparatus of claim 9, wherein the brokering system is external to the wireless network.

12. The apparatus of claim 9, wherein the message comprises a message informing the brokering system that the user requires a certain wireless transmission capacity.

13. The apparatus of claim 12, wherein the brokering system is further configured to detect that an available wireless transmission capacity is not enough to fulfil said certain wireless transmission capacity required by the user.

14. The apparatus of claim 9, wherein the brokering system is further configured to take action to increase wireless transmission capacity available for allocation for the user.

15. The apparatus of claim 14, wherein the brokering system is further configured to request a wireless transmission capacity provider to provide more wireless transmission capacity for the user.

\* \* \* \* \*